Patented Apr. 4, 1950

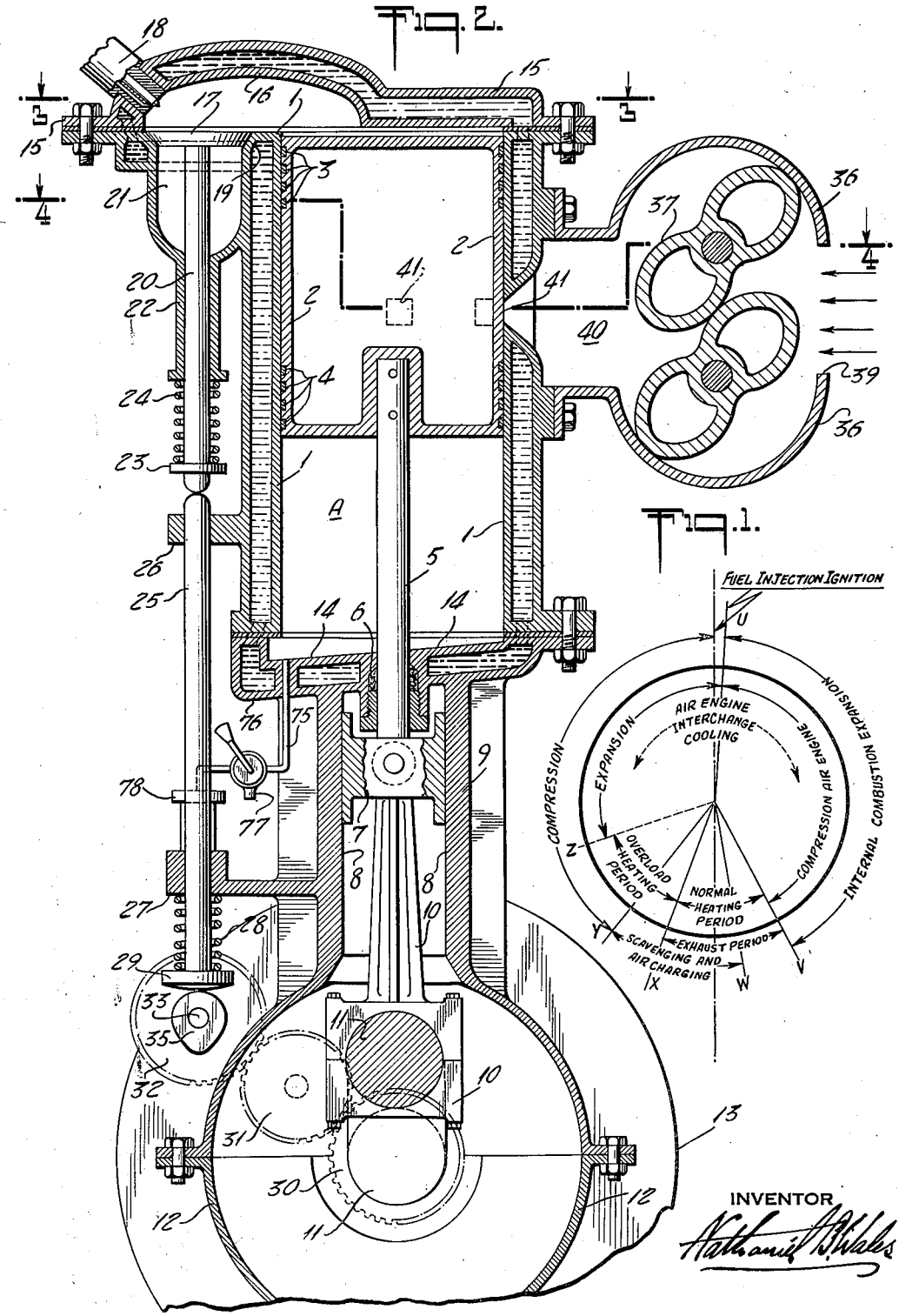

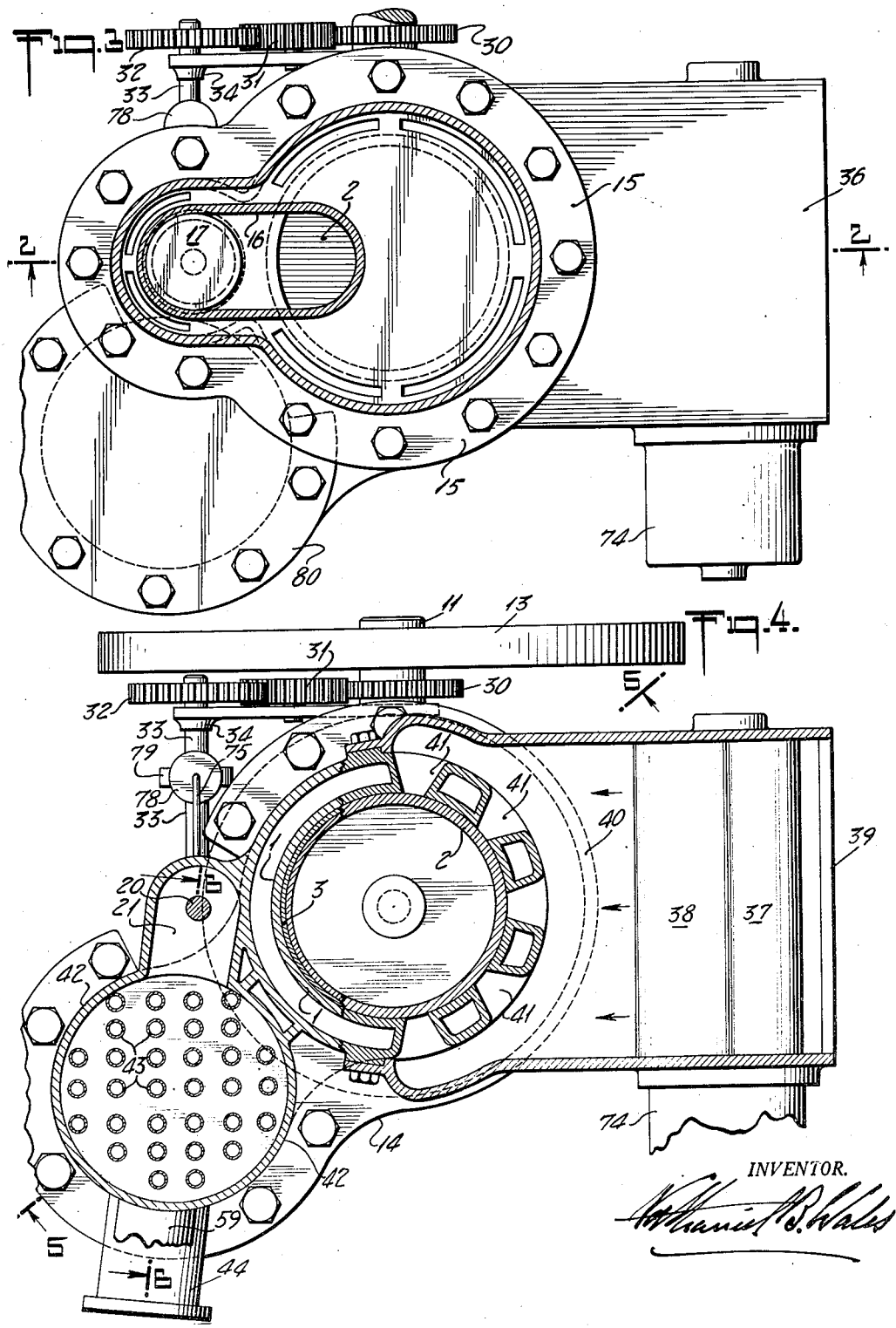

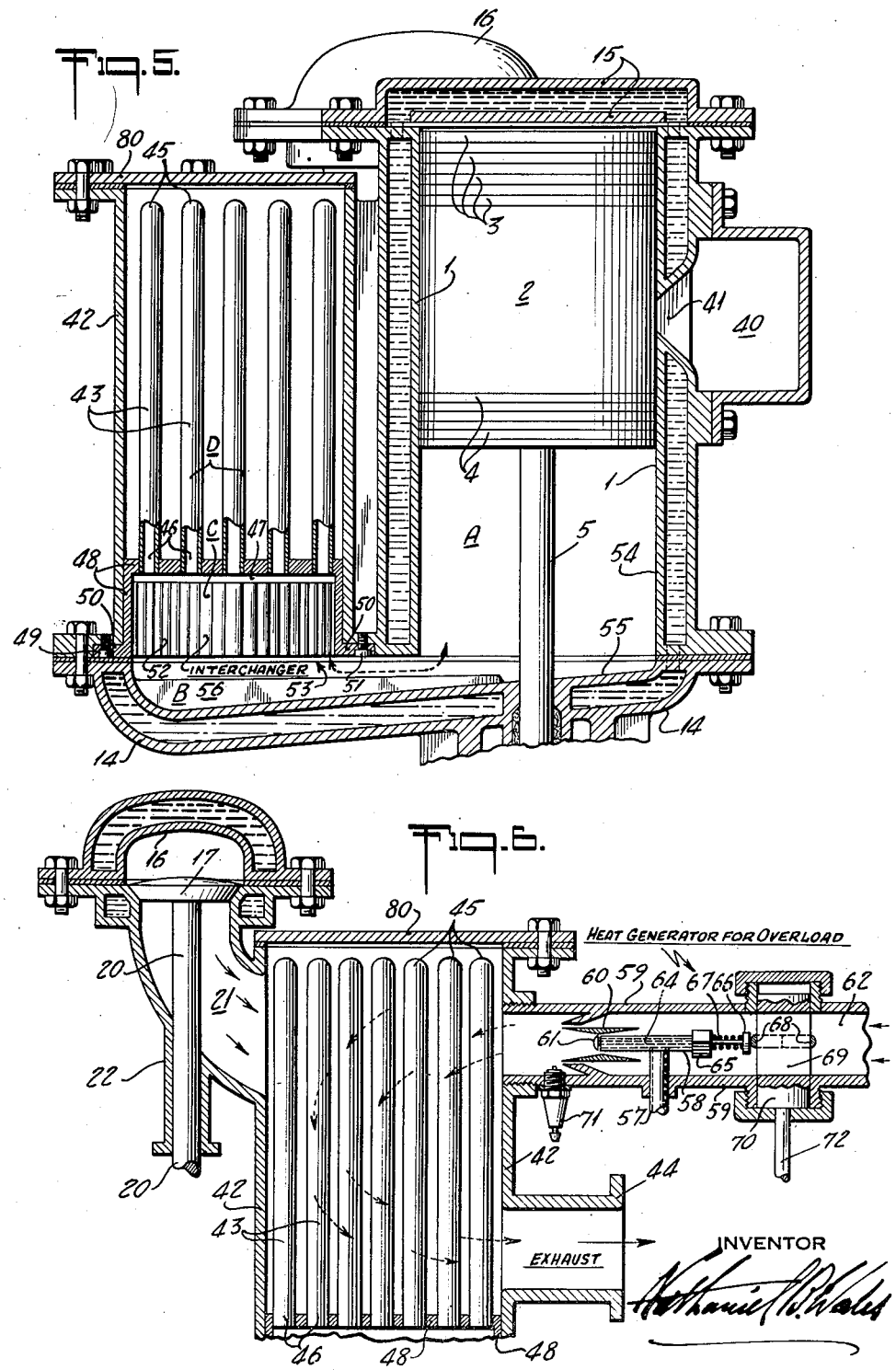

2,502,542

UNITED STATES PATENT OFFICE 2,502,542

BINARY GASEOUS HEAT ENGINE

Nathaniel B. Wales, New York, N. Y., assignor to Industrial Patent Corporation, New York, N. Y.

Application January 30, 1948, Serial No. 5,365

5 Claims. (Cl. 60—14)

This invention relates to a binary gaseous heat engine and is a continuation in part of my copending application Serial Number 2,164, filed January 14, 1948.

One of the objects of this invention is to so coordinate the essential components in a binary engine, which combines an internal combustion cycle with a constant-mass air engine, that the over-all height of the engine is minimized by positioning the heat absorption surface of the air engine adjacent and exterior to a double-acting cylinder, which serves both the internal combustion engine and the air engine.

This construction provides a short and low resistance path for the flow of the exhaust gases from the internal combustion engine over the heat absorption surfaces of the air engine, as well as providing a short and low resistance path for the oscillation of the working-fluid of the air engine between the lower end of the double-acting piston serving the unitary cylinder and the heat absorption elements. This is essential to the efficient and high speed operation of the binary system.

A further object is to develop a relative high over-load factor in such a binary engine in order to approximate the flexibility of the variable cut-off steam engine, by injecting, in timed relation to the timed heat transfer between the two engine cycles, a predetermined additional heat mass which augments and/or prolongs the normal interval of heat interchange inherent in the binary cycle. This additional heat source may enter the heat transfer chamber, wherein the heat absorbing surface of the air engine is positioned, just at a time when the normal interval of heat interchange is terminating so that it will not increase or generate additional back-pressure for the normal exhaust of the internal combustion engine. This additional increment of heat increases the mean effective pressure of the working-fluid during the expansion stroke of the air engine above that of normal maximum operation. The maximum of power generated by the binary engine may be increased by approximately twenty to twenty-five percent. The apparatus necessary for this over-load is simple and inexpensive and may be made to cut-in or cut-out automatically.

Additional objects and pertinent details will be more specifically described and illustrated in the following specifications and drawings which illustrate an embodiment of this invention, wherein similar numerals refer to similar parts.

Figure 1 is a timing diagram of the binary engine cycle. The references around the exterior of the heavy circle refer to the internal combustion cycle, while the references on the inside of the circle refer to the air engine.

Figure 2 is an elevation in section taken on line 2—2 in Figure 3.

Figure 3 is a section in plan, taken on line 3—3 in Figure 2, showing in particular a section of the clearance volume of the two-cycle Diesel engine.

Figure 4 is a section in plan taken on line 4—4 in Figure 2.

Figure 5 is a partial elevation, in section taken on line 5—5 in Figure 4, showing the path of the working-fluid of the air engine and its varying volume as dictated by the lower end of the binary engine's piston and showing the relative position of the heat absorbing elements, heat interchanger and cooling surfaces in the path of flow of the working-fluid.

Figure 6 is a section in elevation, taken on line 6—6 in Figure 4, showing the entry duct from the exhaust valve of the internal combustion engine to the heat interchange chamber in which is positioned the heat absorption element of the air engine. This view also shows the timed automatic injecting and ignition mechanism for generating an additional heating interval for increasing the air engine's output.

Referring to Figure 2, numeral 1 is the engine cylinder in which fits a double-acting piston 2 having on its upper end piston rings 3 sealing the internal combustion engine end of piston 2 and rings 4 on the lower end sealing the air engine end of the piston 2. Piston rod 5, secured to and projecting from the lower end of piston 2 passes through sealing gland 6 in the lower cylinder head 14 and is secured into cross-head block 7, which has suitable cross-head bearing surfaces 8 in engine frame 9. Connecting rod 10 is conventionally journaled in cross-head 7 at its upper end and journaled in crank shaft 11 at its lower end. A crank case 12 having suitable bearings therein (not shown) supports crank shaft 11. A fly-wheel 13 is secured to crank shaft 12. A clearance volume for the internal combustion engine is formed by a chambered recess 16 in the underside of cylinder head 15 conventionally secured to cylinder 1. This chambered recess 16 also forms a registering passage between the exhaust valve 17 and the displacement of piston 2 in cylinder 1.

Following the procedure of a conventional Diesel cycle a conventional injection nozzle 18 enters recess 16 to supply fuel to the compressed air volume therein. The timing, fuel supply and fuel pump mechanism thereof is not shown in view of its well established structure and operation. Exhaust valve 17 is seated on a conventional water cooled valve seat 19. The stem 20 of the exhaust valve 17 passes through chamber 21, see Figure 6, and terminates beyond valve guide-bearing 22. A collar 23, secured to the lower end of stem 20, engages a spring 24 which by its biased compression normally maintains valve 17 in a closed position on valve seat 19. Valve actuating tappet 25, sustained in bearings 26 and 27, is biased downward by virtue of spring 28 under compression between the bearing member 27 and the collar 29 formed on the lower end of valve tappet 25.

A gear 30 secured to crank shaft 11, see Figures 3 and 4, meshes with idler gear 31, which in turn meshes with gear 32 secured to valve shaft 33 which is journaled in bearing 34 and others not shown. On valve shaft 33, suitably secured thereto, is cam 35 which by its rotation lifts the collar 29 and through the engagement of tappet 25 with valve stem 20 overcomes the bias of springs 24 and 28 thereby raising exhaust valve 17 from its seat 19. In this manner exhaust valve 17 is opened at each revolution of crank shaft 11 during the approximate conventional interval defined in timing diagram and denoted by V—X.

As is conventional in Diesel engine two-cycle practise I show a positive displacement blower 36, which is shown driven by direct connected motor 74 and which utilizes impellers 37 and 38 synchronized in their rotation to force air through the blower chamber 36 from inlet opening 39 into the inlet valve port chamber 40, which is in open communication with multiple inlet ports 41 in cylinder 1.

Referring to Figure 6, the exhaust duct 20 leading from exhaust valve 17 opens into exhaust heat-transfer chamber 42, the top of which is closed by cover 80. In chamber 42 are positioned a plurality of tubular elements 43 which compose the heat absorbing surface of the air engine. An exhaust port 44 allows the exhaust gases to leave chamber 42 after they have traversed the heat absorbing surface 43. The tubular heat absorption elements 43 closed at their upper end 45 are expanded into header element 48 at their open lower end 46 and are in open communication with the chamber 47 formed by header element 48. Header element 48 hermetically sealed around its flanged portion 50 is recessed in a companion annulus in chamber 42 and secured therein by bolts 51. It is to be noted that by removing the lower cylinder head 14 the heat interchanger 52 and heat absorber 43 secured to header 48 can be easily removed for servicing.

The heat interchanger 52 is composed of a multitude of small tubes compacted in parallelism to form a low-resistance path through which the working-fluid of the air engine oscillates as dictated by the reciprocation of piston 2 in cylinder 1, which is in open communication with the interchanger 52 through passage 53 formed in the lower cylinder head 14.

The heat interchanger 52 absorbs the heat from the heated working-fluid as it expands as piston 2 rises in cylinder 1 to the position shown in Figure 5, causing a downward flow through the interchanger 52, the working-fluid having previously been heated in tubular heat absorbing elements 43 during the interval piston 2 was in its downward position in cylinder 1, thereby forcing the dense working-fluid of the air engine into element 43, at the interval exhaust valve 17 opened and discharged its waste heat thereon. In this manner a timed heat wave from valve 17 impinges on tubular elements 43. As the piston 2 reaches the upward end of its stroke, as is seen in Figure 5, the working-fluid has expanded into cylinder 1, contacting the relatively cool walls 54 thereof, as well as the water-cooled surface of cylinder-head 14 and is thereby contracted in volume by the lowering of its mean temperature to be again compressed at a comparative low temperature as compared to the mean temperature of its prior expansion. As piston 2 again starts to fall in cylinder 1 it forces the cooled working-fluid through heat interchanger 52 and in its passage therethrough it picks up the heat deposited therein during the prior expansion stroke to again complete its cycle. The heat transfer efficiency of the interchanger is approximately ninety percent.

In order to develop an over-load factor in the binary engine, an additional timed interval, see X—Z, Figure 1, of heat absorption, after the normal heat interchange between the two engine cycles composing the binary system (V—X, Figure 1), is provided by the absorption into the working-fluid of the constant-mass air engine heat generated by the fuel burner, see Figure 6, composed of a fuel supply pipe which enters valve chamber 58. The fuel supply pipe 57 is supported by casing 59 which is suitably secured to and communicating with chamber 42.

A dual Venturi-structure, the first, formed by sleeve 60 which surrounds the fuel valve 61 in chamber 58 and permits a high velocity air-stream to flow around valve 61 from an air-pressure supply entering casing 59 at inlet 62 from a source not shown. The second structure is formed by the outer periphery of sleeve 60 together with a companion annulus 63 extending from casing 59 which supplements the orifice formed by the interior of sleeve 60 and the valve chamber 58.

In valve chamber 58 the stem 64 of valve 61 passes through sealing gland 65 and terminates in a collar 66 secured thereto. Spring 67, interposed between member 65 and collar 66 maintains valve 61 in a closed position until cam 68 secured within and extending beyond each end of air port 69 in rotary valve 70 makes contact with collar 66 and opens valve 61 as valve 70 is rotated by shaft 72 at one-half the speed of crank shaft 11 (connecting mechanism not shown). At this time air port 69 in valve 70 permits air under pressure entering duct 62 to flow therethrough and atomize the fuel passing through valve 61, as well as supplying the necessary air to support combustion. An electric ignition system connected to spark plug 71 and timed in synchronism with the opening of air valve 70 ignites the combustible mixture.

The timed interval during which fuel valve 61 and air valve 70 are opened and spark plug 71 is energized thereby supplying an additional increment of heat to the heat absorbing elements 43 in the air engine and increasing the mean effective pressure of its working-fluid during the expansion stroke above that existing during normal operation, see Figure 1, X—Z. This over-load factor may be set in operation manually or by automatic mechanism dictated by a critical torque-revolutions per minute responsive apparatus connected to the engine's load.

In a marine installation for emergency reverse or for maneuvering this over-load factor is highly desirable, as well as in certain automotive fields.

In order to maintain a predetermined pressure of air, which is the "working medium" of the air engine, in the clearance volume of the air engine as defined by the volumes A, B, C and D in Figure 5 respectively, representing the displacement of piston 2 in cylinder 1, the traverse passage 53 formed in lower cylinder head 14, the volume of the multiple tubes in the heat interchanger 52 and the volume within heat absorbing tubes 43, I employ an automatic air pumping system similar to that fully described in my application Serial Number 2,164 which consists of an air pumping cylinder 78, see Figure 4, operated by cam 79 on valve shaft 33. This automatic air-pumping system is equivalent to any well known air system that supplies air at a predetermined pressure and cuts in and out as the desired air pressure reaches or falls below the critical pressure limits. The compressed air is delivered via pipe 75 into clearance volume A, see Figure 2, of the air engine. A manual air release valve 76 in pipe line 75 allows the working-fluid of the air engine to be vented through port 77 to stop the operation of the air engine. The air engine efficiently operates on an approximate pressure of 600 p. s. i.

Inasmuch as the companion application Serial Number 2,164 discloses the operation of the identical binary system, based on the exhaust heat interchange set up between an internal combustion engine and a constant-mass air engine no further explanation is necessary on the operation of the system.

To those skilled in the art it is evident that this invention also teaches that step in the art on constant mass air engines, when considered as a separate entity entirely apart from a binary heat engine, which consists of generating a timed heat impulse or wave which is allowed to impinge on the heat absorption surface of the air engine at the most effective and efficient interval during each complete cycle to obtain the maximum difference of mean effective pressure between that generated during compression and that generated during expansion. During the remaining interval of each cycling of the air engine no fuel is consumed or heat transmitted to the absorption surface of the engine and therefore no waste occurs. When this step is considered in respect to conventional teaching wherein a constant-burning occurs throughout the repeated cycling of the air engine the thermic advantages are quite apparent.

What I desire to protect by United States Letters Patent is encompassed in the following claims:

1. In a heat engine, the combination comprising a combustion chamber and an air chamber, said combustion chamber positioned above said air chamber in a cylinder, cooling means enclosing said cylinder, a double-acting piston each end thereof serving respectively said combustion chamber and said air chamber, a shaft, means for converting reciprocation of said piston into rotation of said shaft, said double-acting piston in said cylinder producing a minimum volume of said combustion chamber with a corresponding maximum volume of said air chamber, an exhaust valve for said combustion chamber, a hollow heat-absorbing element in open communication with said air chamber, said heat-absorbing element positioned in a heat-transfer chamber exterior to said cylinder, means to operate said combustion chamber as a two-cycle internal combustion engine, means for operating said air chamber as a constant-mass air engine, duct means conveying the exhaust from said exhaust valve into said heat transfer chamber and means for causing the exhaust gases from said combustion chamber timed by said exhaust valve to heat periodically the air mass in said heat-absorbing element at the time of minimum volume of said air chamber and maximum volume of said combustion chamber.

2. In a heat engine, the combination comprising a combustion chamber and an air chamber positioned one above the other in a cylinder, cooling means jacketing said cylinder, a double-acting piston each end thereof serving respectively said combustion chamber and said air chamber, a shaft, means for converting reciprocation of said piston into rotation of said shaft, said double-acting piston in said cylinder effecting a minimum volume of said combustion chamber with a corresponding maximum volume of said air chamber, an exhaust valve for said combustion chamber, heat-absorbing elements in open communication with said air chamber, said heat-absorbing elements positioned in a heat-transfer chamber exterior to said cylinder, means to operate said combustion chamber as a two-cycle internal combustion engine, means for operating said air chamber as a constant-mass air engine, duct means conducting the exhaust from said exhaust valve into said heat-transfer chamber, said exhaust valve causing the exhaust gases from said combustion chamber to heat periodically the air mass in said heat-absorbing elements at the time of minimum volume of said air chamber and maximum volume of said combustion chamber.

3. In a heat engine, the combination comprising a combustion chamber, means to cool said combustion chamber, a piston therefor, a shaft, crank means for converting reciprocation of said combustion chamber piston into rotation of said shaft, an air chamber, means to cool said air chamber, a piston therefor, crank means for converting the reciprocation of said air chamber piston into rotation of said shaft in such relationship that the minimum volume of said air chamber corresponds with the maximum volume of said combustion chamber, means to operate said combustion chamber as a two-cycle internal combustion engine, means for operating said air chamber as a constant-mass air engine, means for causing the exhaust gases from said combustion chamber to heat for a predetermined period the air mass in said air chamber at the time of said minimum volume of said air chamber and said maximum volume of said combustion chamber.

4. In a heat engine, the combination comprising a combustion chamber and an air chamber positioned one above the other in a cylinder, means to cool said combustion chamber and said air chamber, a double-acting piston each end thereof serving respectively said combustion chamber and said air chamber, a shaft, means for converting reciprocation of said piston into rotation of said shaft, said double-acting piston effecting in its reciprocation a minimum volume of said air chamber with a corresponding maximum volume of said combustion chamber, an exhaust valve for said combustion chamber, hollow heat-absorbing element positioned in a heat-transfer chamber exterior to and parallel with said cylinder and in communication with said air chamber, means to operate said combustion chamber as a two-cycle internal combustion engine, means to operate said air chamber as a constant-mass air engine, duct means conducting the exhaust from said exhaust valve into said heat-transfer chamber, means for causing the exhaust gases from said combustion chamber through the media of said exhaust valve to heat periodically the air mass in said heat-absorbing element at the time of said minimum volume of said air chamber and said maximum volume of said combustion chamber.

5. A heat engine, comprising a cylinder, cooling means associated with said cylinder, a piston in said cylinder, a shaft, means to convert the rotation of said shaft into reciprocation of said piston, an air engine volume in open operative communication with said piston, a cooling element and a heat-interchanger positioned in said air engine volume, a hollow heat-absorbing element connected to said air engine volume, said heat-absorbing element positioned in an enclosing chamber, means for supplying and maintaining a predetermined minimum of air pressure in said air engine volume, means for timing the discharge of a combustible mixture to generate a timed heat interval in said enclosing chamber in timed relation to the reciprocation of said piston in said cylinder.

NATHANIEL B. WALES.

REFERENCES CITED

The following references are of record in the file of this patent:

UNITED STATES PATENTS

| Number | Name | Date |
|---|---|---|
| 708,637 | Heckert | Sept. 9, 1902 |
| 966,032 | Mann | Aug. 2, 1910 |